United States Patent
Lappin

[15] 3,705,560
[45] Dec. 12, 1972

[54] SECTIONAL ARTICULATED AGRICULTURAL APPARATUS

[72] Inventor: Douglas E. Lappin, Logan, Kans. 67646

[22] Filed: Sept. 24, 1971

[21] Appl. No.: 183,476

Related U.S. Application Data

[63] Continuation-in-part of Ser. No. 14,973, Feb. 27, 1970, abandoned.

[52] U.S. Cl. ..................111/85, 172/310, 172/484, 56/228, 111/52, 111/73, 280/415 R
[51] Int. Cl. ..................................................A01c 5/00
[58] Field of Search..........................111/1, 6–7, 52, 111/60, 62, 85; 56/228; 172/44, 240, 248, 456, 310–311; 280/415 R

[56] References Cited

UNITED STATES PATENTS

| | | | |
|---|---|---|---|
| 2,731,901 | 1/1956 | Tye | 172/311 |
| 2,947,372 | 8/1960 | Olson | 111/52 X |
| 3,240,005 | 3/1966 | Rowse | 172/310 X |
| 3,322,202 | 5/1967 | Van Sickle et al | 172/310 X |
| 3,610,661 | 10/1971 | Pierce et al | 172/248 X |
| 3,651,870 | 3/1972 | Calkins | 172/44 |

Primary Examiner—Robert E. Bagwill
Attorney—Berman, Davidson and Berman

[57] ABSTRACT

A seed planting apparatus consisting of a first section with one or more similar sections attached thereto. Each section has furrowing means, seed dropping means and press wheels. Optionally, tanks for holding water or liquid fertilizer are mounted on each section with pipes running to the rear of each furrowing means. Each section is supported on aster wheels at its front corners and centrally of its rear edge to form a generally triangular suspension. The wheels supporting the rear of the first section can be swiveled from a position for travel in one direction to a position for travel at 90° thereto with the wheels being releasably locked in each of the two positions.

In the field, all sections in side by side relation are towed from a hitch on the first section. In transport position, all sections are towed in an end to end relationship by a hitch attached to the end of the side sections. In transport position, all of the caster wheels swivel freely except the rear set on the first section. In the field position, all of the rear wheels are releasably locked to keep them from swiveling about their caster axis while all of the forward wheels are permitted to swivel.

17 Claims, 21 Drawing Figures 3,705,560

SECTIONAL ARTICULATED AGRICULTURAL APPARATUS

CROSS REFERENCE TO RELATED APPLICATION

This application is a continuation-in-part of my copending application, Ser. No. 14,973, filed Feb. 27, 1970 and now abandoned, entitled "SECTIONAL ARTICULATED AGRICULTURAL APPARATUS".

BACKGROUND OF THE INVENTION

FIELD OF THE INVENTION

The present invention relates to seed planters of the type for planting seeds over a relative wide area.

SUMMARY OF THE INVENTION

The present invention is directed to a seed planter made up of one or more sections coupled together to permit the sections to conform to an uneven ground surface in the field. The sections are each supported triangularly on caster wheels with a caster wheel at each front corner and centrally of the rear. The apparatus is adapted to be moved through the field with the sections articulatedly connected together in side by side relation with the rear caster wheels locked against swiveling. The apparatus is adapted to be transported over the road from place to place by towing the sections in end to end relation with all wheels swiveling except the rear wheels on the central section which are locked in a position 90° removed from the position when moving through the field.

The primary object of the invention is to provide a seed planting apparatus in which a relatively high number of seed furrows can be opened, planted and closed by the apparatus while conforming to the surface of the uneven ground over which it is moving.

Other objects and advantages will become apparent from the following specification when considered in light of the attached drawings.

DESCRIPTION OF THE PREFERRED EMBODIMENTS

Referring now to the drawings in detail wherein like reference characters indicate like parts throughout the several figures, the reference numeral 30 indicates generally a three-section planting apparatus constructed in accordance with the invention.

The three-section planting apparatus 30 includes a center section generally indicated at A, a left-side section generally indicated at B, and a right-side section generally indicated at C. The sections A,B,C each include a frame 31. The frame 31 is generally horizontal and is formed of generally square tubular members and includes a transverse front member 32, a transverse rear member 33, and a pair of spaced parallel longitudinally extending side members 34, 35. A pair of longitudinal members 36, 37 are arranged in spaced parallel relation and are spaced inwardly from the side members 34, 35. The frame members 32, 33 are welded respectively to the forward and rear ends of the frame members 34, 35, 36 and 37 and lie in the same horizontal plane therewith. A stub frame member 38 is rigidly secured to the frame member 32 and extends forwardly therefrom, lying in the same horizontal plane. An extension 39 extends integrally from one end of the frame member 32. A stub frame member 40 is rigidly secured to the frame member 32 and extends forwardly therefrom in the same horizontal plane therewith.

A pair of spaced apart parallel posts 41, 42 depend from the frame member 32 generally perpendicular thereto and have spaced parallel plates 43 extending forwardly from the lower ends thereof. A generally V-shaped towing tongue 44 has its spaced apart ends releasably and pivotally secured between the plates 43 by pivot pins 45.

Figure 3:
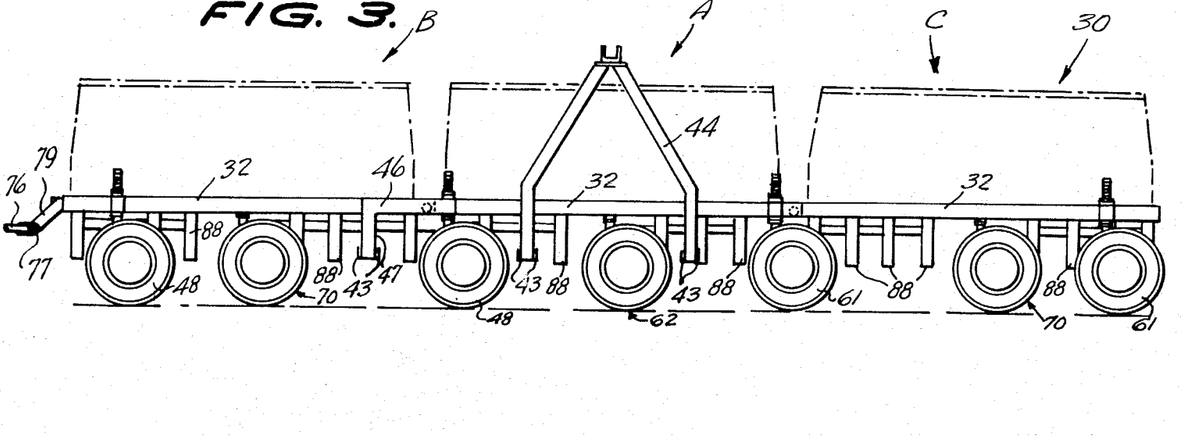
FIG. 3 is a side elevation of the structure illustrated in FIG. 2.
Figure 4:
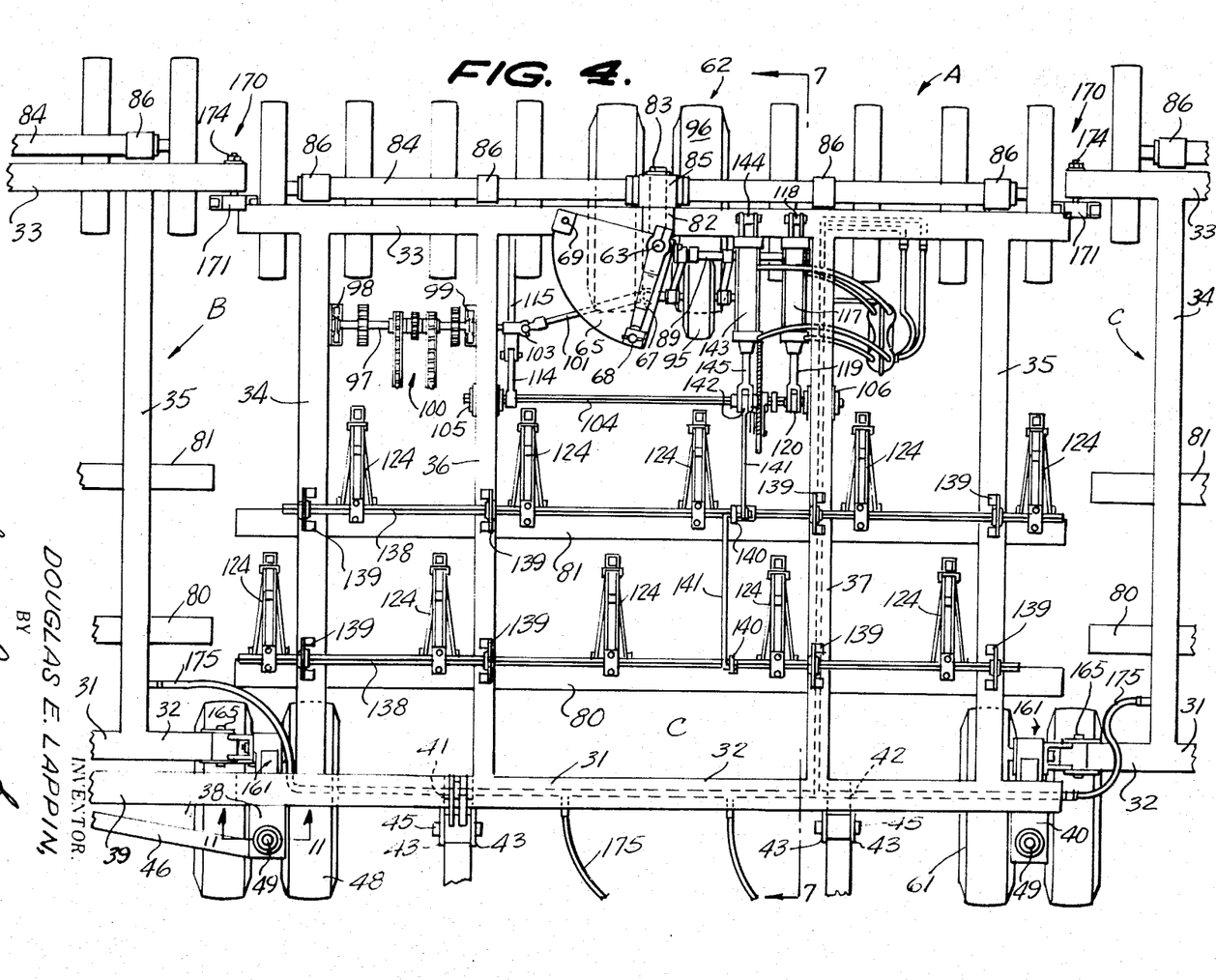
FIG. 4 is a top plan view of the central section of the complete planter.
Figure 5A:
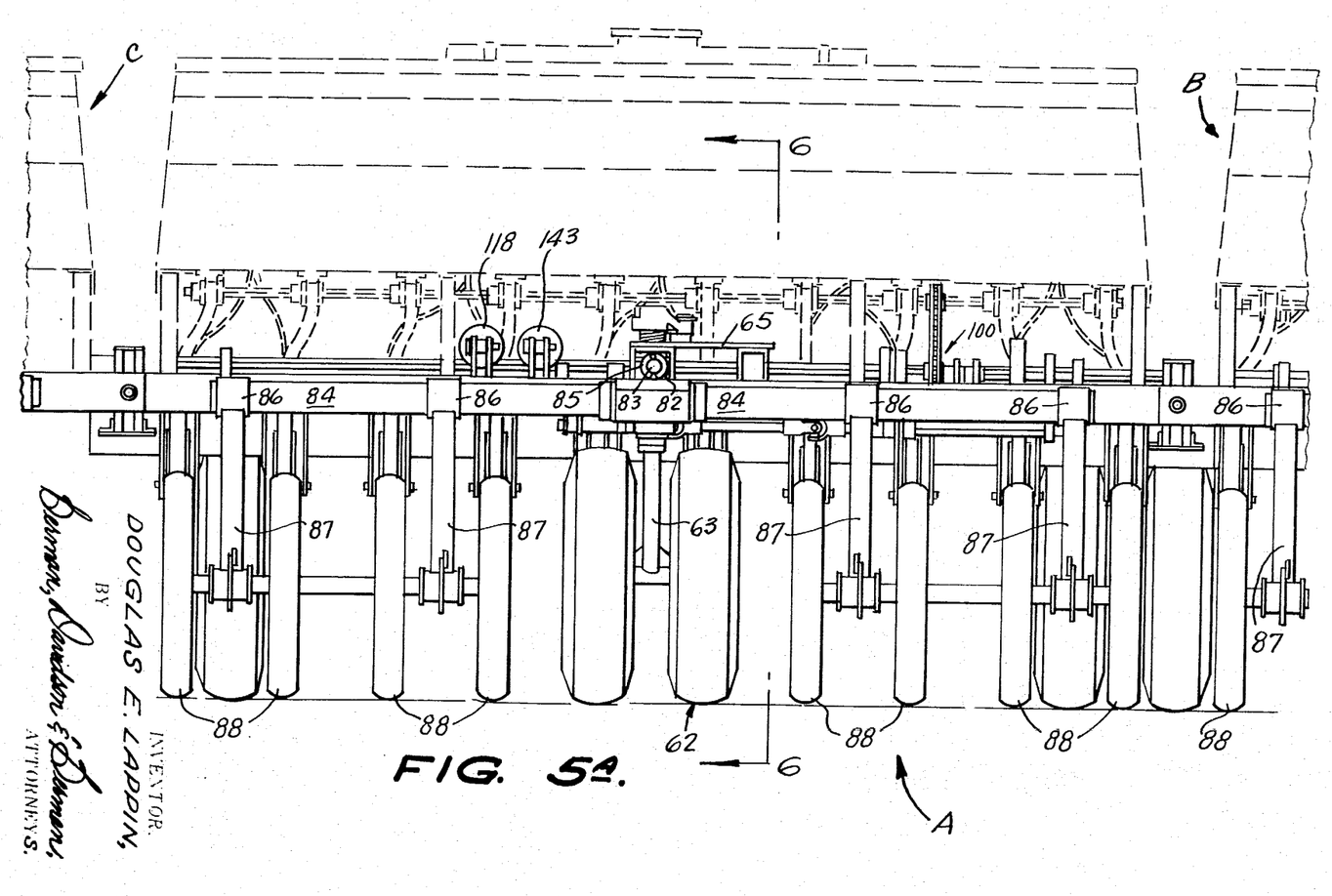
FIG. 5A is a rear elevation of the planter central section.
Figure 5B:
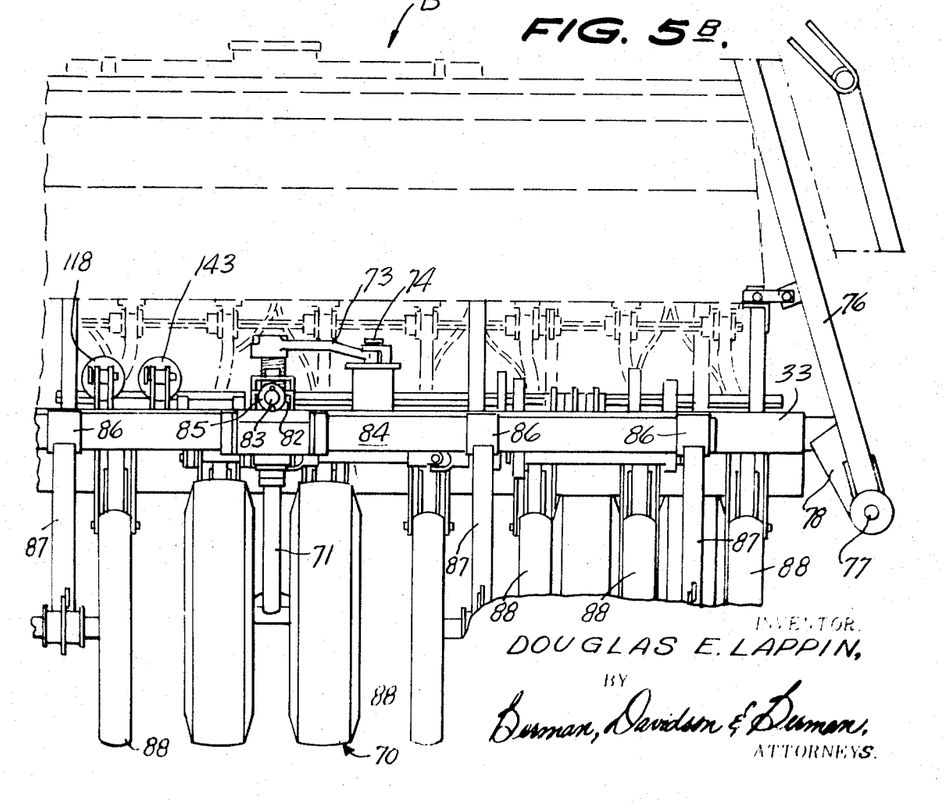
FIG. 5B is a rear elevation of the side section having the road tongue attached thereto.

A generally horizontal brace 46 extends angularly forwardly and inwardly from the outer end of the extension frame member 39 to the forward end of the stub frame member 38 and is rigidly secured to each at its opposite ends by welding. A post 47 is rigidly secured to the outer end of the extension frame member 39 in spaced parallel relation to the posts 41, 42 and is similarly provided with forwardly extending spaced parallel plates 43 on its lower end. The spacing between the post 47 and the post 41 is identical to the spacing between the post 41 and the post 42 to permit the yoke tongue 44 to be mounted centrally of the frame 31, as illustrated in FIGS. 3 and 4, or offset to one side, as illustrated in broken lines in FIG. 1.

A pair of caster wheels 48 are secured to a vertical shaft 49 for swiveling action thereabout. The shaft 49 is provided with a collar 50 secured thereto by means of a set screw 51 and a friction disc 52 is supported on the collar 50. A flanged sleeve 53 is supported on the disc 52 surrounding the shaft 49 and a cylindrical bearing 54 is mounted in the sleeve 53 in engagement with the shaft 49. The sleeve 53 extends up through a bore 55 in the stub frame member 38 and a second bore 56 is provided in the upper end of the stub frame member 38 to receive an identical sleeve 53 having an identical bearing 54 therein. A compression coil spring 57 surrounds the upper end of the shaft 49 in engagement with the upper sleeve 53. A washer 58 on the shaft 49 engages the upper end of the compression spring 57 and a nut 59 bears against the washer 58 to maintain pressure on the spring 57. A jam nut 60 locks the lock nut 59 in its adjusted position. The construction illustrated in FIG. 11 and described above provides a damping effect on the turning of the caster 48 about the vertical pivot of the shaft 49. Caster wheels 61 identical in every respect to the caster wheels 48 are mounted on a vertical shaft 49 which extends through the stub shaft member 40 in exactly the same manner as the shaft 49 extended through the stub frame member 38.

Figures 1, 11, 18:
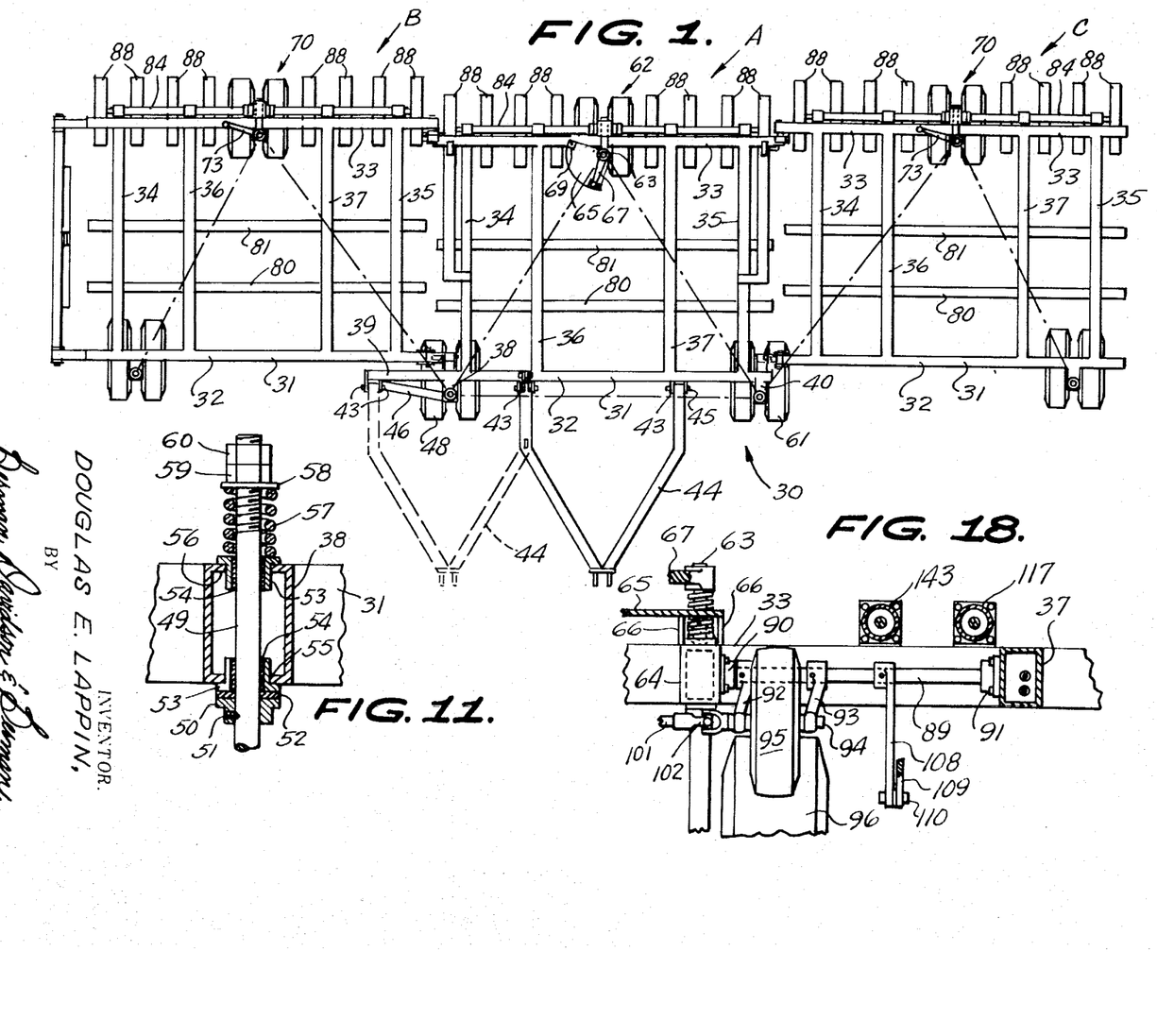
FIG. 1 is a top plan view of the planter, illustrating the basic frame and its support with a part of the apparatus omitted for clarity, the planter being illustrated in field position.
FIG. 11 is a sectional detail of the caster damping device.
FIG. 18 is a transverse vertical sectional view taken along the line 18—18 of FIG. 6, looking in the direction of the arrows.
Figure 2:
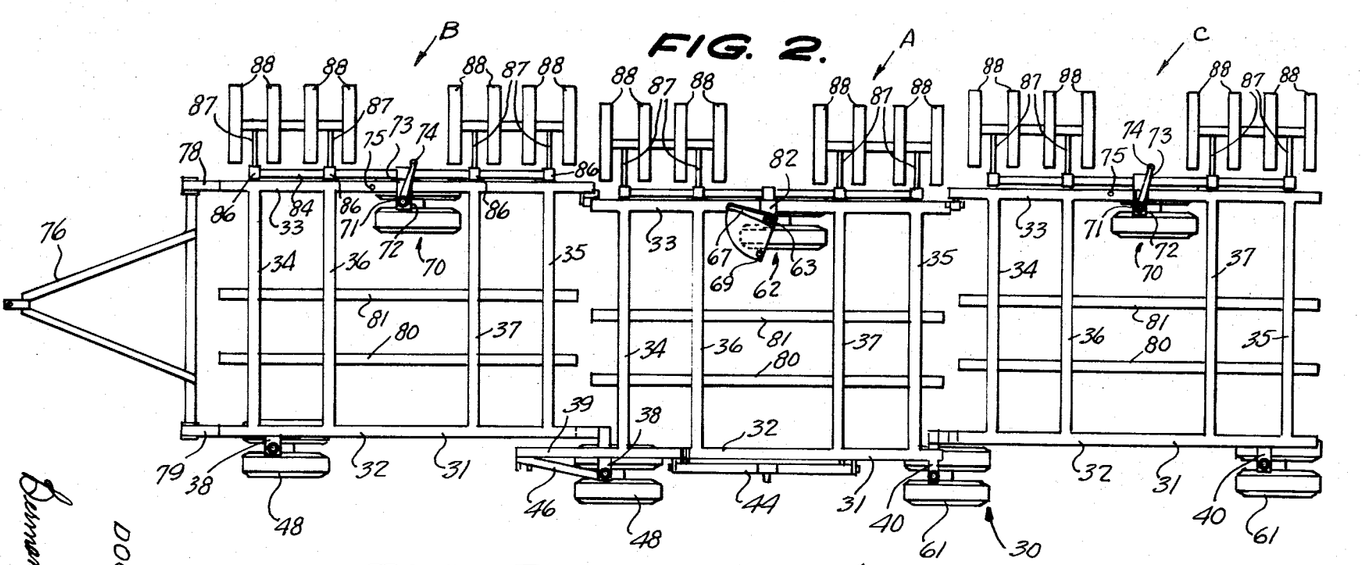
FIG. 2 is a view similar to FIG. 1, illustrating the planter in road transport position.

The center section A of the planter 30 has a set of caster wheels generally indicated at 62 mounted for swiveling action on a vertical shaft 63. The shaft 63 extends through and is journaled in a stub frame member 64 rigidly secured and extending forwardly from the rear frame member 33. The sector plate 65 is supported on a bracket 66 extending upwardly from and rigidly secured to the stub frame member 64. An arm 67 is rigidly secured to the upper end of the shaft 63 for rotary movement on the shaft 63 across the sector plate 65. A lock pin 68 on the outer end of the arm 67 is provided for engagement in bores 69 at opposite ends of the sector plate 65 to lock the wheels 62 in a position parallel to the longitudinal side frame members 34, 35 or parallel to the transverse front and rear frame members 32, 33. The two positions of adjustment are illustrated in FIGS. 1 and 2, respectively.

The right left side sections C and B of the planter 30 each have a set of caster wheels, indicated generally at 70, swivelly mounted on a shaft 71 which is journaled in a stub frame member 72 mounted on the rear frame member 33 of the sections B and C. An arm 73 is rigidly secured to the upper end of the shaft 71 and turns with the caster wheels 70. A lock pin 74 in the outer end of the arm 73 is adapted to engage through a bore 75 in the rear frame member 33 in order to lock the caster wheels 70 in a position parallel to the longitudinal side frame member 34, 35.

Section B of the planter 30 is provided with a tongue 76 secured by pivot pins 77 to downwardly and forwardly sloping frame extensions 78, 79. The frame extensions 78, 79 are respectively secured to the free ends of the rear frame member 33 and the forward frame member 32. The tongue 76 is generally triangular in form and can be lowered to a draft position or raised to a field position as desired. A transverse frame member 80 extends completely across each of the frames 31 underlying the frame members 34, 35, 36 and 37 while being positioned in parallel relation to the forward frame member 32. A second frame member 81 extends across the frame 31 parallel to the frame member 80 and similarly underlying the frame 31. The frame members 80, 81 may be welded or otherwise secured to the frame 31, as desired. A shaft support 82 is rigidly secured to the center of each of the rear frame members 33 intermediate the opposite ends thereof with a horizontal shaft 83 extending rearwardly therefrom. An elongate hollow shaft 84 extends across the frame 31 slightly rearwardly of and parallel to the rear frame member 33. The shaft 84 is journaled centrally in a bushing 85 mounted for swinging movement about a longitudinal horizontal axis on the shaft 83.

Figure 7:
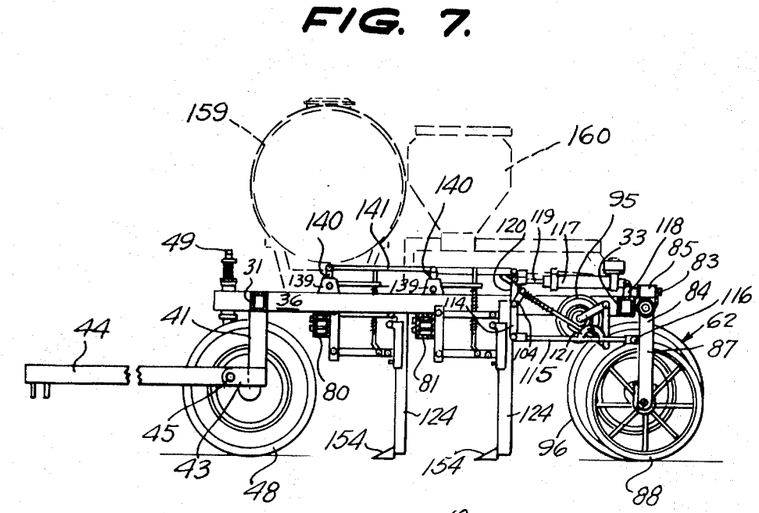
FIG. 7 is a longitudinal sectional view taken along the line 7—7 of FIG. 4, looking in the direction of the arrows.
Figure 8:
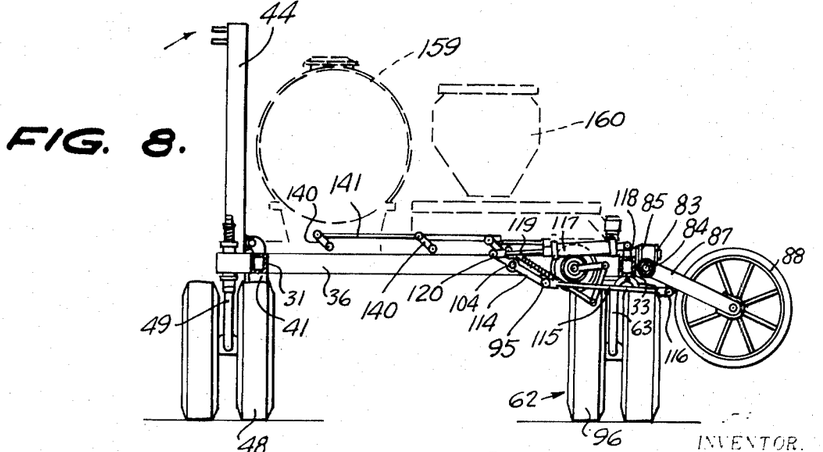
FIG. 8 is a view similar to FIG. 7 with the tongue raised and with the planting mechanism in raised position.
Figure 9:
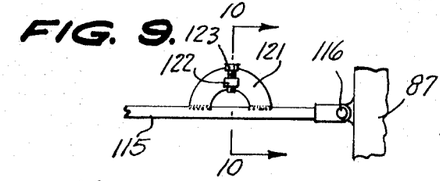
FIG. 9 is an elevational view of a construction detail.
Figure 10:
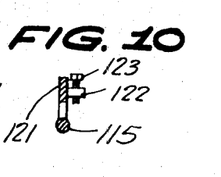
FIG. 10 is a transverse sectional view taken along the line 10—10 of FIG. 9, looking in the direction of the arrows.

Each of the shafts 84 have a plurality of brackets 86 rigidly mounted thereon for rotary movement with the shaft 84. A post 87 is fixed to each of the brackets 86 and extends perpendicularly outwardly from the shaft 84 to swing from a generally horizontal position to a generally vertical position about the shaft 84. The posts 87 have secured to their lower ends a plurality of furrow closing wheel units 88. the furrow closing wheel units 88 are adapted to swing with the posts 87 from operation position, as illustrated in FIG. 7, to a storage position, as illustrated in FIG. 8.

A horizontal shaft 89 is arranged in forwardly spaced parallel relation to the rear frame member 33 and has one end journaled in a bushing 90 secured to the stub frame 64 and the opposite end journaled in a bushing 91 secured to a longitudinal member 37. The shaft 89 is arranged parallel to the ground. A pair of spaced parallel arms 92, 93 are rigidly secured to the shaft 89 and have a shaft 94 journaled in their outer ends. The shaft 94 is parallel to the shaft 89 and is adapted to swing thereabout. A drive wheel 95 is secured to the shaft 94 and turns therewith. The drive wheel 95 is arranged in aligned relation with a tire 96 forming part of the set of caster wheels 62.

A shaft 97 has one end journaled in a bushing 98 carried by the side frame member 34 and the opposite end journaled in a bushing 99 carried by the longitudinal member 36. Drive elements indicated generally at 100 are carried by the shaft 97 for reasons to be assigned. A shaft 101 is connected to the shaft 94 by means of a universal joint 102 with its opposite end connected to the shaft 97 by means of a universal joint 103 so that with the wheel 95 engagement with the tire 96, the shafts 94, 101 and 97 are all rotated.

Figure 6:
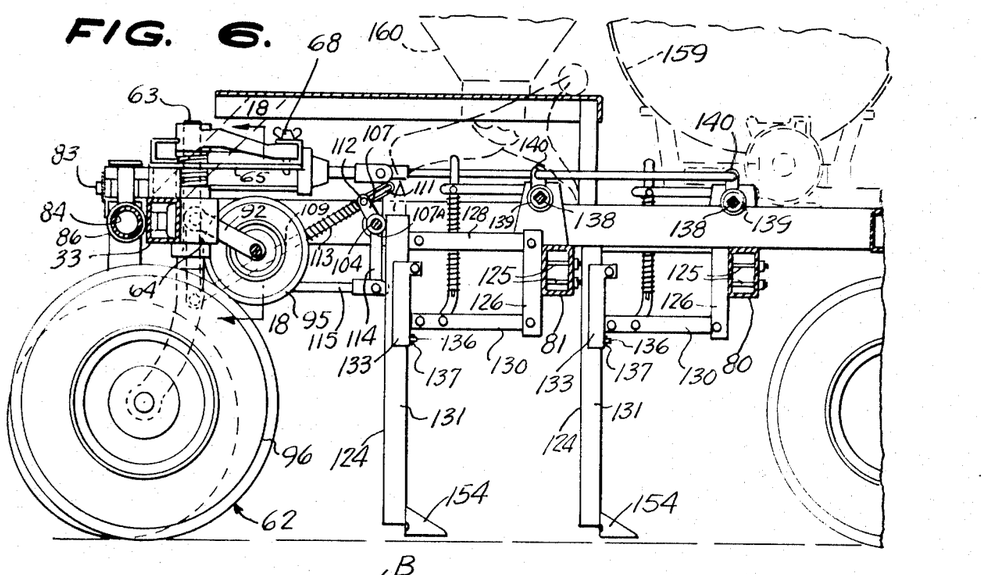
FIG. 6 is a fragmentary longitudinal sectional view taken along the line 6—6 of FIG. 5A, looking in the direction of the arrows.

A shaft 104 has one end journaled in a bushing 105 carried by the longitudinal member 36 and the opposite end journaled in a bushing 106 carried by the longitudinal member 37. The shaft 104 is parallel to the shaft 89 and is spaced forwardly therefrom. An arm 107 is rigidly secured to a bushing 107A journaled on the shaft 104 and extends upwardly therefrom. An arm 108 is rigidly secured to the shaft 89 and extends downwardly therefrom. A link arm 109 is secured to the lower end of the arm 108 by means of a pivot pin 110. The link arm 109 extends upwardly and forwardly having a slot 111 in its forward end. A pin 112 extends through the slot 111 and is secured to the upper end of the arm 107 to permit a sliding connection between the arm 107 and link 109. A coil spring 113 normally urges the link arm 109 rearwardly with respect to the arm 107 so as to maintain a resilient engagement between the wheel 95 and the tire 96. Rotation of the shaft 104 in a clockwise direction, as viewed in FIG. 6, will first move the pin 112 forwardly in the slot 111 and then will cause the link arm 109 to move forwardly, pulling the arm 108 forwardly and rotating the shaft 89 in a counterclockwise direction to raise the wheel 95 out of engagement with the tire 96.

An arm 114 is rigidly secured to the shaft 104 in depending relation thereto and has a link arm 115 pivotally secured thereto and extending rearwardly therefrom. The link arm 115 is pivotally secured at 116 to the post 87 so that rotation of the shaft 104 in a counterclockwise direction, as viewed in FIGS. 7 and 8, will move the post 87 rearwardly, pivoting them about the hollow shaft 84. Movement of the posts 87 rearwardly swings the furrow closing wheel units 88 upwardly out of contact with the ground, as seen in FIG. 8.

A hydraulic cylinder 117 is pivotally secured to a bracket 118 mounted on the rear frame member 33. A piston rod 119 extends forwardly from the hydraulic cylinder 117 and is pivotally connected to an arm 120 rigidly mounted on the shaft 104 and extending upwardly therefrom. Movement of the piston rod 119 in and out of the hydraulic cylinder 117 rotates the shaft 104 through the arm 120 to move the wheel 95 into and out of contact with the tire 96 and the furrow closing wheel units 88 into and out of contact with the ground. Upon rotation of the shaft 104 in a counterclockwise direction, as viewed in FIGS. 7 and 8, the wheel 95 is raised out of contact with the tire 96 and the furrow closing wheel units 88 are raised out of contact with the ground.

A yoke 121 is secured to the link arm 115 by welding or the like and has a threaded boss 122 secured thereon. A bolt 123 is threaded into the boss 122 and is adapted to engage the underside of the rear frame member 33, as can be seen in FIG. 8, to limit the upward swinging motion of the posts 87.

Figure 12:
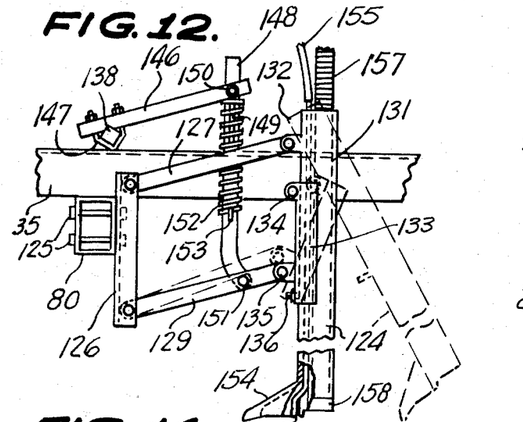
FIG. 12 is a side elevational view of one of the furrow openers in raised position, shown partially broken away and in section for convenience of illustration.
Figure 13:
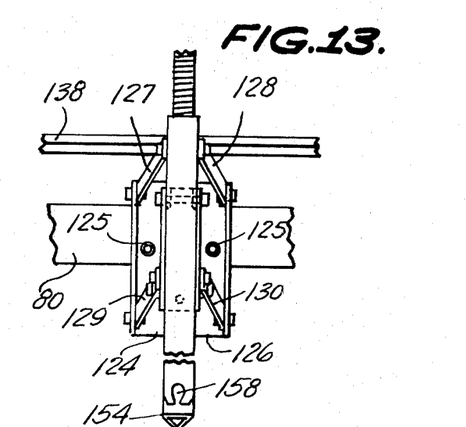
FIG. 13 is a rear elevation of the structure shown in FIG. 12.

A plurality of furrow opening units 124 are secured to the transverse frame member 80 and the transverse frame member 81 by means of bolts 125. The furrow opening units 124 are illustrated in detail in FIGS. 12 and 13 and include a channel base member 126 secured by the bolts 125 to the transverse frame members 80 or 81. A pair of converging links 127, 128 are pivotally secured to the upper end of the channel base member 126 and extends rearwardly therefrom. A second pair of converging link members 129, 130 have their forward ends pivotally secured to the lower end of the channel base member 126 and extend rearwardly therefrom. An upright tube 131 is pivotally secured at 132 to the rear ends of the links 127, 128. A bracket 133 is pivotally secured at 134 to the tube 131 at a point spaced below the links 127, 128. The bracket 133 adjacent its lower end is pivotally secured at 135 to the forward ends of the links 129, 130. A pin 136 rigidly secured to the tube 131 extends through an aperture in the bracket 133 and has a shear pin 137 fixed therein to secure the bracket 133 to the tube 131.

A shaft 138 is journaled in a plurality of bushings 139 mounted on the side frame members 34, 35 and the longitudinal frame members 36, 37. An arm 140 extends upwardly from each of the shafts 138 and a link 141 is pivotally secured to each of the arms 140 and extends rearwardly therefrom. An arm 143 is rigidly secured to the bushing 107A, journaled on the shaft 104 for rotation thereabout, and is pivotally secured to the rear end of the link 141. A hydraulic cylinder 143 is pivotally mounted on a bracket 144 carried by the rear frame member 33 and has a piston rod 145 pivotally connected to the upper end of the arm 142.

An arm 146 is rigidly secured to the shaft 138 by means of a U-bolt 147 with one arm 146 overlying each of the furrow opening units 124. A link 148 has a slot 149 extending vertically therein through which a pivot bolt 150 extends while also passing through the arm 146 to pivotally secure the arm 146 to the link 148. The lower end of the arm 148 is pivotally secured by a pivot pin 151 to the links 129, 130. A coil spring 152 encompasses the link 148 engaging a transverse pin 153 at its lower end and the arm 146 at the upper end. The coil spring 152 is a compression spring and normally urges the link 148 downwardly with respect to the arm 146.

Upon actuation of the hydraulic cylinder 143, the piston rod 145 pivots the arm 142 about the shaft 104 and moves the links 141 forwardly to rotate the shafts 138. Rotation of the shafts 138 swings the arm 146 vertically to raise or lower the links 148 and through them the tubes 131 are caused to move vertically, swinging on the links 127, 128 and 129, 130. The furrow opener 124 has a plow point 154 on the lower end of the tube 124 and is provided with a fertilizer tube 155 extending internally thereof. The tube 155 opens at 156 to deposit fertilizer in the bottom of the furrow. A seed tube 157 is connected to the tube 124 to feed seed downwardly therethrough to exit through aperture 158 into the bottom of the furrow. In the event the furrow opener 124 strikes a root or other obstruction, the shear pin 137 shears off, permitting the tube 124 to pivot rearwardly to the position illustrated in broken lines in FIG. 12.

Liquid fertilizer and/or water tanks 159 are to be mounted on the frame 31 and connected to the fertilizer tube 155 to deposit water and/or fertilizer in the furrows during planting. Seed hoppers 160 are similarly mounted on the frame 31 and are connected to the seed tubes 157 to move seeds downwardly therethrough.

Conventional agitator and feed devices in the seed hopper 160, and conventional pumps in the fertilizer and/or water tanks 159 are adapted to be driven in a conventional manner by the drive elements 100 extending from the shaft 97.

Figure 14:
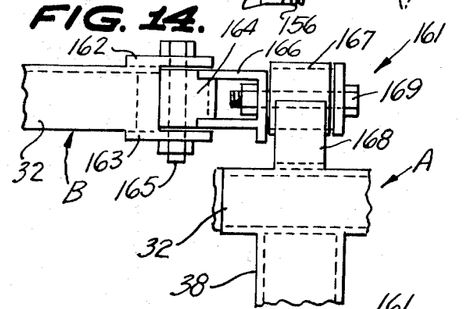
FIG. 14 is a top plan view of a section joint at the forward ends of the sections when in field position.
Figure 15:
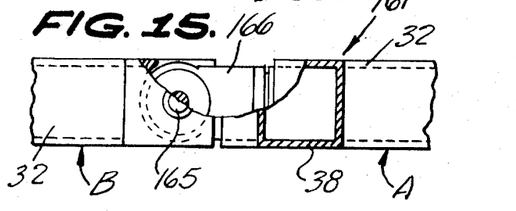
FIG. 15 is a side elevation of the structure shown in FIG. 14, partially broken away and in section for convenience of illustration.

The frames 31 are connected at their forward ends by universal joints generally indicated at 161 and shown in detail in FIGS. 14 and 15. The universal joint 161 includes a pair of ears 162, 163, which are secured to the end of the frame member 32 of the section B, frame 31. A bushing 164 is positioned between the ears 162, 163 and is pivotally mounted therein by a pivot pin 165. The pivot pin 165 is horizontal and extends longitudinally of the planter 30. A U-shaped yoke member 166 is secured to the bushing 164 and extends horizontally outwardly therefrom. A bushing 167 is secured to a frame extension 168 on the rear side of the frame member 32 forming part of the section A, frame 31. A pivot bolt 169 extends through the bushing 167 and into the yoke 166 to provide a transverse horizontal pivot for the universal joint 161. The universal joints 161 permit the frames 31 of the sections A, B and C to pivot at their forward ends with relation to each other about a longitudinal pivot and about a transverse pivot.

Figure 16:
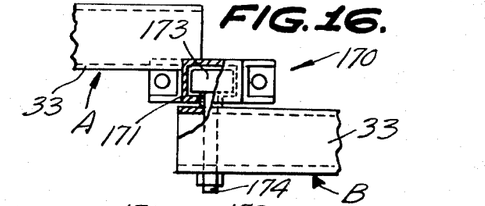
FIG. 16 is a top plan view of a section connector at the rear of the sections when in field position, shown partially broken away and in section for convenience of illustration.
Figure 17:
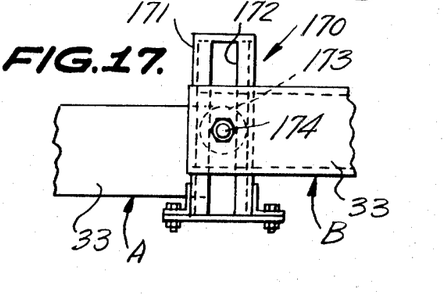
FIG. 17 is a side elevation of the structure shown in FIG. 16.

The rear ends of the frames 31 of the sections A, B and C are connected by a sliding pivot unit indicated generally at 170, and illustrated in detail in FIGS. 16 and 17. The unit 170 includes a vertical channel box member 171 which is secured to the inner end of the rear frame member 33 of the section A at each end thereof and has a vertical slot 172 formed therein. A roller 173 is mounted for vertical movement in the channel box 171 and is journaled on a shaft 174 which is secured to the inner end of the rear frame member 33 of the sections B and C. The sliding pivot units 170 permit the frame 31 in the sections B and C to pivot about a longitudinal horizontal pivot with respect to the section A, frame 31, and to vertically slide as pivotal movement occurs about the transverse pivot pins 169 of the universal joints 161.

Conventional hydraulic lines 175 extend between the units A, B and C and to a tractor unit to provide hydraulic force for the hydraulic cylinders 117, 143.

Figure 19:
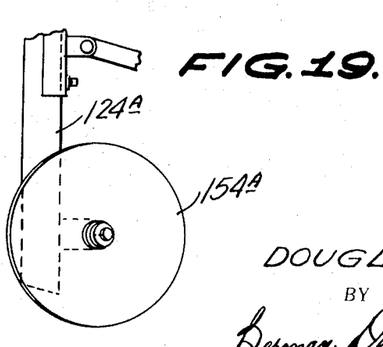
FIG. 19 is a side elevation of a modified form of furrow opener.
Figure 20:
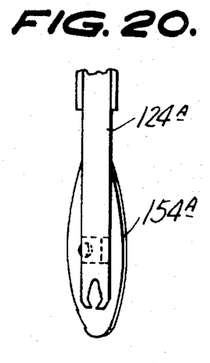
FIG. 20 is a rear elevation of the structure illustrated in FIG. 19.

In FIGS. 19 and 20, a modified form of furrow opener unit 124A is illustrated wherein a disc 154A replaces the plow point 154.

The planter 30, as described herein, includes a center section A, a left section B and a right section C with these sections each having a tripod mounting which permits each section to accommodate itself to the terrain over which it passes, even though the adjacent section is accommodating itself to a different terrain. When the machine is seeding, cultivating or harrowing, in paths from one to three sections wide, one must expect to encounter irregularities of slope and elevation in the terrain. This requires rather specialized connections between the sections described above as universal joints 161 and sliding pivot units 170. Due to the width of the three sections of the planter, it has been constructed so that each of the sections can float over the surface of the ground relatively independently from any other section in order to conform to the irregularities of the terrain.

In order to transmit the pulling power of the tractor from the drawbar 44 through section A and from there to the side sections B and C and yet unable all three sections to conform to irregular terrain, the joints 161 and the unit 170 have been provided. The joint 161 and unit 170 allow considerable fluctuation in the planes of the frames of the sections A, B and C while rigidly maintaining the side-by-side spacing therebetween.

In using the machine as a planter with all three sections A, B and C in operation, the tongue 44 is connected to a tractor and hydraulic lines 175 are connected to the hydraulic system of the tractor. The wheels 62 are locked in their position parallel to the side frame members 34, 35 and the swivel wheels 70 are also locked parallel thereto. The hydraulic cylinders 117, 143 are actuated to lower the furrow opening units 124 and the furrow closing wheel units 88 while also bringing the drive wheel 95 into contact with the tire 96 to actuate the drive elements 100. The planter 30 is then drawn forwardly by the tractor and planting takes place. Upon the completion of the planting operation, the hydraulic cylinders 117, 143 are actuated to raise the furrow opening units 124, raise the furrow closing wheel units 88 and raise the drive wheel 95 out of contact with the tire 96. The tongue 44 is then raised and locked in an upright position and the tongue 76 is lowered for attachment to the tractor. The caster wheels 70 are unlocked and the caster wheels 62 are unlocked and the tractor is moved forward to cause the caster wheel units 48, 61, 70 and 62 to swing parallel to the front and rear frame members 32, 33, respectively. With the caster wheel 62 swung parallel to frame member 33, it is locked on the sector 65 with the remaining caster wheel units being left unlocked so as to swing about as required to follow the towing tractor.

In the event that only the sections A and B are to be used for planting, the tongue 44 is moved from its position mounted centrally of the section A to its position at one end of the section A, where it is centrally mounted with respect to sections A and B.

Caster mounted wheels develop a tendency to oscillate or shimmy at speeds above a crawl and the mounting thereof in the instant invention dampens such oscillations to permit the machine to be operated at road speeds when desired. It also should be noted that with all wheels castering except the rear wheels of the center section A, surprising sharp turns may be made either right or left as well as backing the machine in a straight line when such is required.

Having thus described the preferred embodiments of the invention, it should be understood that numerous structural modifications and adaptations may be resorted to without departing from the spirit of the invention.

What is claimed is:

1. A planter for movement during planting in one direction and for transport movement in a second direction at right angles to the first direction comprising a generally rectangular horizontal frame, a front caster wheel unit secured to each front corner of said frame, a rear caster wheel unit secured to the rear portion of said frame intermediate the opposite sides of said frame with said front and rear caster wheel units forming a tripod support for said frame, means on said caster wheel unit cooperating with means on said frame for releasably locking said rear caster wheel unit with the wheels positioned for travel in one direction toward the front of said frame and for releasably locking said wheels for travel in a second direction at right angles to the first direction, a plurality of furrow opening planting units secured to said frame for movement from an extended planting position to an elevated travel position, hydraulically actuated means on said frame for lowering and raising said furrow opening planting units, means on said frame for dispensing seed, water and fertilizer to said planting units, drive means on said frame for actuating said dispensing means, a drive wheel connected to said drive means and swingably mounted on said frame for movement from an elevated non-driving position to a lowered driving position in engagement with one of said rear caster wheels, and hydraulic means on said frame for moving said drive wheel to and from drive position.

2. A device as claimed in claim 1, including a second generally rectangular horizontal frame positioned adjacent one side of said first frame, means connecting the adjacent front corners of said first and second frames for pivotal movement about a horizontal longitudinal axis and about a horizontal transverse axis, means connecting the adjacent rear corners of said first and second frames for respective vertical sliding movement and for pivotal movement about a horizontal longitudinal axis, a front caster wheel unit secured to the front corner of said second frame opposite said first frame, a rear caster wheel unit secured to the rear portion of said second frame intermediate the opposite sides thereof, means on said last-named rear caster wheel unit cooperating with means on said second frame for releasably locking said last-named unit for travel in a direction toward the front of said second frame, and planting units on said second frame identical to the planting units on said first frame.

3. A device as claimed in claim 2, including a third generally rectangular horizontal frame positioned adjacent the other side of said first frame, means connecting the adjacent front corners of said first and third frames for pivotal movement about a horizontal longitudinal axis and about a horizontal transverse axis, means connecting the adjacent rear corners of said first and third frames for respective vertical sliding movement and for pivotal movement about a horizontal longitudinal axis, a front caster wheel unit secured to the front corner of said third frame opposite said first frame, a rear caster wheel unit secured to the rear portion of said third frame intermediate the opposite sides thereof, means on said last-named rear caster wheel unit cooperating with means on said third frame for releasably locking said last-named unit for travel in a direction toward the front of said third frame, and planting units on said third frame identical to the planting units on said first frame.

4. A device as claimed in claim 3, wherein means are provided on each of said caster wheel units for damping the castering action thereof to provide a steady support for said frames.

5. A device as claimed in claim 4, including a V-shaped tongue pivotally secured to the front of said first-named frame for moving said planter through the field, and a tongue pivotally secured to the side of said second frame for moving said planter endwise during transport thereof.

6. A device as claimed in claim 4, wherein said planting units include vertically spaced pairs of parallel links mounting said planting unit on said frame for substantial vertical movement from planting position to elevated travel position.

7. A device as claimed in claim 6, wherein means are provided on said planting unit for releasably holding said planting unit in planting position for release upon engagement of said planting unit with a stationary object.

8. A device as claimed in claim 7, wherein the means for holding said planting unit in planting position includes a shearable shear pin.

9. A device as claimed in claim 3, including a plurality of furrow closing wheel units positioned at the rear of each of said frames, means mounting said furrow closing wheel units for swinging movement from a position engaging the ground for closing the furrows therein to a position elevated above the ground to permit transport of the planter, and means connecting the furrow closing mounting means with the hydraulically actuated means for lowering and raising said furrow opening planting units to simultaneously raise the furrow closing wheel units when raising the furrow opening planting units and for lowering the furrow closing wheel units upon lowering of the furrow opening planting units.

10. A device as claimed in claim 3, wherein resilient means are provided between said drive wheel and the hydraulic means of said frame for moving said drive wheel to resiliently maintain the engagement between said drive wheel and said one rear caster wheel with said drive wheel in drive position.

11. A device as claimed in claim 3, including a V-shaped tongue pivotally secured to the front of said first-named frame for moving said planter through the field, and a tongue pivotally secured to the side of said second frame for moving said planter endwise during transport thereof.

12. A device as claimed in claim 2, wherein resilient means are provided between said drive wheel and the hydraulic means of said frame for moving said drive wheel to resiliently maintain the engagement between said drive wheel and said one rear caster wheel with said drive wheel in drive position.

13. A device as claimed in claim 2, including a V-shaped tongue pivotally secured to the front of said first-named frame for moving said planter through the field, and a tongue pivotally secured to the side of said second frame for moving said planter endwise during transport thereof.

14. A device as claimed in claim 1, wherein resilient means are provided between said drive wheel and the hydraulic means of said frame for moving said drive wheel to resiliently maintain the engagement between said drive wheel and said one rear caster wheel with said drive wheel in drive position.

15. A device as claimed in claim 1, wherein said planting units include vertically spaced pairs of parallel links mounting said planting unit on said frame for substantial vertical movement from planting position to elevated travel position.

16. A device as claimed in claim 15, wherein means provided on said planting unit for releasably holding said planting unit in planting position for release upon engagement of said planting unit with a stationary object.

17. A device as claimed in claim 16, wherein the means for holding said planting unit in planting position includes a shearable shear pin.

* * * * *